(12) United States Patent
Sedy

(10) Patent No.: US 6,293,555 B1
(45) Date of Patent: Sep. 25, 2001

(54) SECONDARY SEAL FOR NON-CONTACTING FACE SEALS

(76) Inventor: Josef Sedy, 1612 Greenwood Dr., Mt. Prospect, IL (US) 60056

( * ) Notice: Subject to any disclaimer, the term of this patent is extended or adjusted under 35 U.S.C. 154(b) by 0 days.

(21) Appl. No.: 09/495,683

(22) Filed: Feb. 1, 2000

(51) Int. Cl.[7] ....................................... F16J 15/34
(52) U.S. Cl. ........................... 277/379; 277/382; 277/385
(58) Field of Search ..................... 277/348, 379, 277/381, 382, 385, 390

(56) References Cited

U.S. PATENT DOCUMENTS

| | | | | |
|---|---|---|---|---|
| 2,420,718 | * | 5/1947 | Odelius ................................. | 277/352 |
| 3,245,692 | * | 4/1966 | Voitik ................................... | 277/373 |
| 3,586,289 | * | 6/1971 | Priese ................................... | 251/214 |
| 3,746,349 | * | 7/1973 | Smale et al. ......................... | 277/398 |
| 4,171,819 | * | 10/1979 | Martineau ............................ | 277/398 |
| 4,239,240 | * | 12/1980 | Wilkinson ............................ | 277/382 |
| 4,427,204 | * | 1/1984 | Alley .................................... | 277/390 |
| 5,149,249 | * | 9/1992 | Schellong et al. ................... | 277/369 |
| 5,161,806 | * | 11/1992 | Balsells ................................ | 277/383 |
| 5,172,918 | * | 12/1992 | Pecht et al. .......................... | 277/400 |
| 5,370,403 | * | 12/1994 | Sedy ..................................... | 277/390 |
| 5,560,622 | * | 10/1996 | Sedy ..................................... | 277/390 |
| 5,735,530 | * | 4/1998 | Merkin et al. ....................... | 277/412 |
| 6,139,021 | * | 10/2000 | Huang .................................. | 277/434 |

* cited by examiner

*Primary Examiner*—Anthony Knight
*Assistant Examiner*—Alison K. Pickard

(57) ABSTRACT

A Non-contacting face type pressure sealing assembly for shafts rotating at high speeds, such as for example those of centrifugal compressors, such assembly having at least two mating sealing rings. One of the subject sealing rings is fixed to the rotating shaft. The other is non-rotating but typically biased by coil springs and allowed to slide within the seal housing in the axial direction. Non-rotating sealing ring is sealed at the housing by an arrangement of two elastomeric elements, one a sealing O-ring the other a compliant force transmitter. Compliant force transmitter can also be an O-ring or it can be an element triangular in cross-section. Angular contact between the two elements maintains transmission of the axial coil spring load towards the non-rotating ring, but also derives a radial load needed for low friction contact at the sealing O-ring.

12 Claims, 2 Drawing Sheets

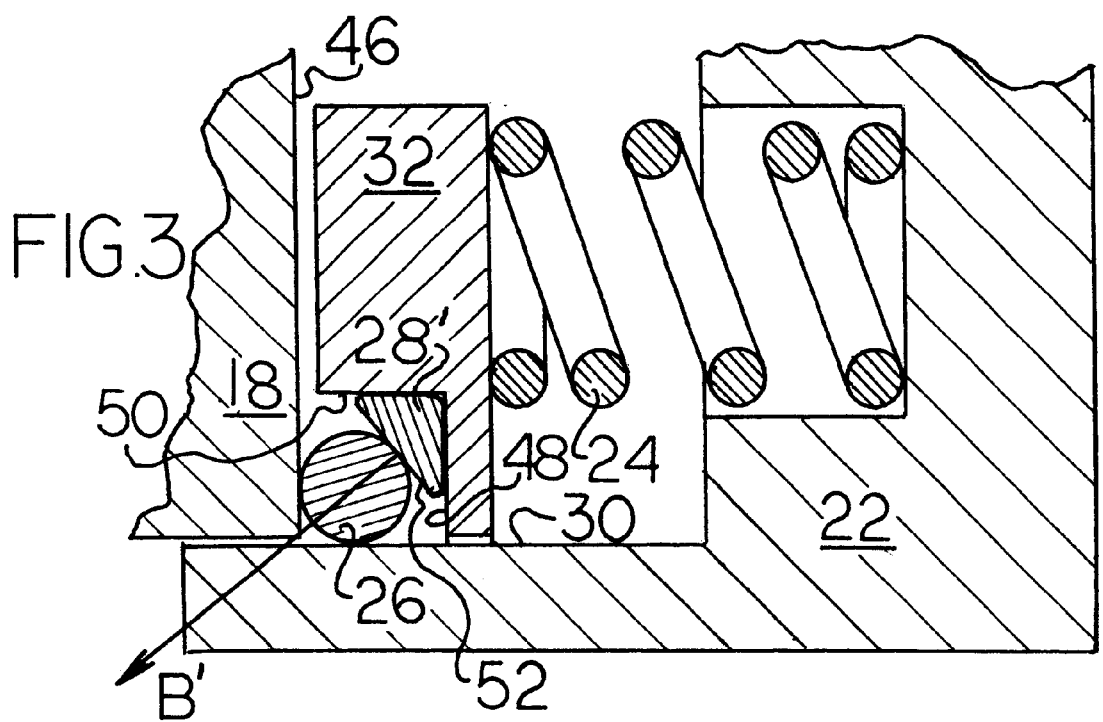

SECONDARY SEAL FOR NON-CONTACTING FACE SEALS

This invention relates to sealing devices for rotating shafts where fluid is employed to generate pressure-induced forces between interacting face-type sealing elements, one being stationary and the other rotating. These forces provide for slight separation and non-contacting operation of the above sealing elements, thereby minimizing face wear and friction losses while maintaining low fluid leakage. More specifically, this invention relates to an improved secondary seal for cooperation with one of the sealing elements of the sealing device.

BACKGROUND OF THE INVENTION

Non-contacting face seal assemblies are usually applied to high-speed, high-pressure rotating equipment where the use of ordinary mechanical face seal assemblies with face contact would result in excessive generation of heat and wear. Non-contacting operation avoids this undesirable face contact when the shaft is rotating above a certain minimum speed, which is often called a lift-off speed.

As with ordinary contacting-type mechanical seal assemblies, a non-contacting face seal assembly consists of two sealing rings, each of which being provided with a very precisely finished sealing surface or face. These surfaces are perpendicular to and concentric with the axis of shaft rotation. Both rings are positioned adjacent to each other with the sealing surfaces in contact at a condition of zero pressure differential and zero speed of rotation. One of the rings is normally fixed to the rotatable shaft, and the other is located within the seal housing structure and allowed to move axially. To enable axial movement of this sealing ring and yet prevent leakage of the sealed fluid, a static sealing element is placed between this ring and the housing. This static sealing element must permit some sliding motion while under pressure, and therefore a top quality O-ring is normally selected for that duty. This O-ring is often called the secondary seal.

To achieve non-contacting operation of the seal assembly, one of the two sealing surfaces in contact is usually provided with shallow surface recesses, which act to generate pressure fields that force the two sealing surfaces apart. When the magnitude of the forces resulting from these pressure fields is large enough to overcome the forces that urge the seal faces closed, the sealing surfaces will separate and form a clearance, resulting in non-contacting operation. The character of the separation forces is such that their magnitude decreases with the increase of face separation. Opposing or closing forces, on the other hand, depend on sealed pressure level and as such are independent of face separation. They result from the sealed pressure and the spring arrangement acting on the back surface of the axially movable sealing ring. Since the separation or opening force depends on the separation distance between sealing surfaces, during the operation of the seal or on imposition of sufficient pressure differential, equilibrium separation between both surfaces will establish itself. This occurs when closing and opening forces are in equilibrium and equal to each other. Equilibrium separation constantly changes within the range of gaps. The goal is to have the low limit of this range above zero to prevent face contact. Another goal is to make this range as narrow as possible, because on its high end the separation between the faces will lead to high seal leakage. Since non-contacting seals operate by definition with a clearance between sealing surfaces, their leakage will be higher than that of a contacting seal of similar geometry. Yet, the absence of contact will mean near-zero wear on the sealing surfaces and also a relatively low amount of heat generated between them. It is this low generated heat and a lack of wear that enables the application of non-contacting seal assemblies (commonly referred to as dry gas seals) to high-speed turbo machinery, where the sealed fluid is gas. Turbo compressors are used to compress this fluid and since gas has a relatively low mass, they normally operate at very high speeds and with a number of compression stages in series.

1. Field of the Invention

During a typical period of operation, a turbo compressor is started and the power unit starts the shaft rotating. At the initial warm-up stage of operation, shaft speeds may be quite low. Typically, oil is used to support the shaft at its two radial bearings and one thrust bearing. Oil warms up in oil pumps and also accepts shear heat from compressor bearings. The oil together with process fluid turbulence and compression in turn warm-up the compressor. Once the full operating speed is reached the compressor reaches in time some elevated equilibrium temperature. On shutdown, shaft rotation stops and the compressor begins to cool down. In this situation, various components of the compressor cool down at different rates and, importantly, the shaft contracts with decreasing temperature at a different rate than the compressor casing. The net result of this at the seal assembly is the axial creeping motion of the shaft and the seal parts fixed to it, which may move the rotatable sealing face away from the stationary sealing face. With often only a spring load behind the stationary sealing ring, the stationary sealing face may not be able to follow the retracting rotatable face, if the above-mentioned secondary seal has too much friction. The term used often in the industry for this phenomenon is "seal face hang-up". In such case very high leakage of process fluid may be observed the next time the compressor is restarted and often in such cases the seal assembly must be removed and replaced at a considerable cost in time and lost production. Initial reason for the high secondary seal friction is the O-ring manufacturing non-uniformity. This non-uniformity is subsequently aggravated by gradual O-ring swell in the presence of oils, other liquids and due to ingestion of sealed gas and by the accumulation of dirt in the vicinity of the O-ring. Consequently, if such a secondary seal is placed into radially un-yielding space, it exerts increasing radial loads on contact surfaces resulting in increasing friction. Eventually the friction becomes so high that the seal hangs-up open.

2. Description of Prior Art

Prior art per U.S. Pat. No. 3,245,692 FIG. 1 teaches a secondary seal arrangement, where axial wave spring biases an O-ring in axial direction against a stationary seal face and a garter spring biases it inwardly at an angle towards the cylindrical housing extension. Unlike with present invention, two spring means are employed to do the biasing of the O-ring. Further, several solutions of the seal face hang-up appeared recently, such as U.S. Pat. Nos. 5,370,403 and 5,560,622 as well as 5,639,097. The improvement these items of prior art provide is a compliant spring element, positioned at the outer diameter of and cooperating with the secondary O-ring. The requirement to squeeze the secondary O-ring into a uniform radial gap with the consequence of high friction forces is thus eliminated, as compliant spring element will exert radial force, which is more or less independent of the O-ring non-uniformities. Subject prior art thus requires an additional spring element to provide this elastic radial load around the elastomer sealing O-ring.

Again, unlike with present invention, two spring means of biasing are employed.

SUMMARY AND OBJECT OF THE INVENTION

As with recent prior art, this invention is also aimed at the reduction of friction forces at the secondary seal of a non-contacting face seal assembly to prevent its excessive drag and the corresponding hang-up of the axially movable seal face which can cause high process fluid leakage as experienced with secondary seal solutions where an O-ring or similar elastomer seal would be placed between two concentric cylindrical surfaces. While these surfaces could be machined with a high degree of accuracy to provide for uniform radial clearance to accept the secondary seal, the elastomer-type secondary seal itself is typically quite non-uniform in its cross-section. To eliminate the possibility of leakage, the radial clearance for those secondary seals had to be narrower than what was the cross-sectional dimension of the secondary seal at its thinnest point. Given the relatively high non-uniformity of O-ring cross-section, this resulted in considerable squeeze in areas where the secondary seal was thicker, and this in turn resulted in considerable friction and drag. To remedy this, prior art solutions would replace machined surface around the secondary O-ring with an elastic spring, making thus-imposed radial force on the secondary O-ring relatively independent of the O-ring cross-section non-uniformities, resulting in low friction characteristic. Unlike the above prior art, present invention does not require a separate spring element to place lower and more uniform load onto the secondary seal. Instead, axial spring load for the sealing face itself is translated into axial and radial components through use of double O-ring arrangement, where two O-rings of similar or different cross-section and of similar or different hardness, one non-sealing and one sealing, are placed diagonally into a typically rectangular space between the non-rotating sealing ring and the disc of the disc—springs—retainer structure. Angularity of the above diagonal position when expressed as an angle between the straight line connecting cross-section centers of the above two O-rings and the axial direction is in the vicinity of 33° and may range from about 10° to about 70°. There are a number of O-ring cross-section sizes available commercially, these are typically called nominal sizes and given in fractions of an inch or in millimeters. There are five nominal inch sizes between $\frac{1}{16}$ and $\frac{1}{4}$ inches. Durometer hardness is the industry standard for O-ring hardness evaluation. O-rings typically range from softest grades at 50 durometer to hardest at 90 durometer. Since the non-sealing O-ring is elastic, it provides the secondary sealing O-ring with a load, which is relatively uniform, similar to that of the radial spring per recent prior art, the load that is relatively independent of variations in the secondary O-ring cross-section. This results in dramatically lower friction and drag forces and therefore lesser danger of the seal face hang-up, resulting in more reliable sealing action. The above arrangement allows variation of the ratio of the axial and radial biasing through changes in dimensions of the space, rectangular in cross-section, occupied corner-to-corner by said double O-ring. This is accomplished without the need for independent spring means to impose the radial load onto the secondary sealing O-ring. Arrangements are also possible, where the non-sealing O-ring is replaced with an elastic element triangular in cross-section with sharp or rounded corners, called here a wedge element, two sides of subject wedge mating with one corner of said rectangular cross-section space. Dimensions of the subject triangular cross-section shape will be such, that the ratio of its shortest side to its longest side will be in the vicinity of 0.55 and may range from about 0.17 to 0.94.

One advantage of the double O-ring or the O-ring—wedge secondary seal arrangements therefore is the fact that they use existing axial springs to provide both axial and radial secondary seal loads, therefore there is no need for introduction of separate spring means as is the case with prior art solutions.

Another advantage of the secondary seal arrangements per this invention is the opportunity to apply it to seals made with early prior art solutions through simple replacement of the single secondary O-ring with double O-ring or O-ring—wedge arrangements without need for any other major modifications. Thus early prior art seals can be easily upgraded to remove their susceptibility to seal face hang-up.

Other objects and purposes of the invention will be apparent from the detailed description of the invention as presented below.

BRIEF DESCRIPTION OF THE DRAWINGS

FIG. 3 is an enlarged fragmentary cross-sectional view of another embodiment of the invention.

DESCRIPTION OF THE PREFERRED EMBODIMENTS

Figure 1:
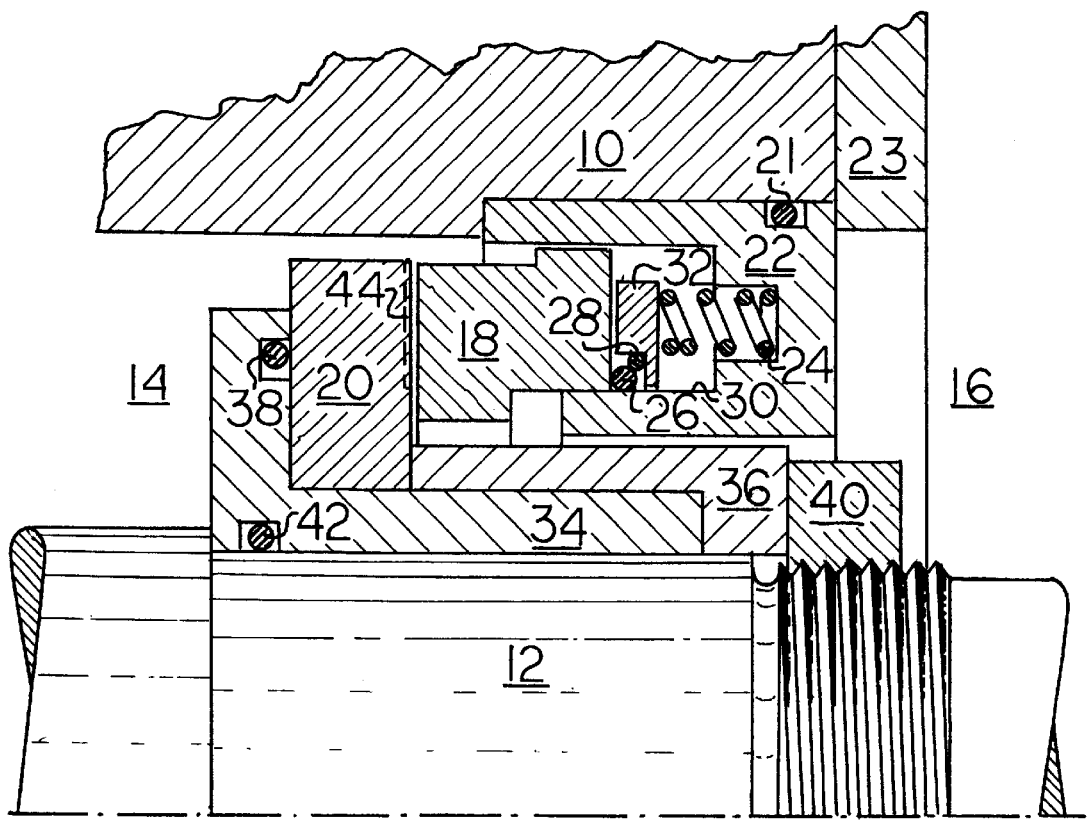
FIG. 1 is a cross-sectional view of a non-contacting seal, construct in accordance with this invention, taken along the longitudinal axis thereof.

Referring first to FIG. 1, there is shown the invention and its environment. This environment comprises a housing 10 and a rotatable shaft 12, extending through said housing. The invention is applied to seal a fluid within an annular space 14 and to restrict its escape into the fluid environment at 16. The basic components of the invention comprise an annular, axially movable sealing ring 18 in a sealing relationship with an annular rotatable sealing ring 20. The sealing ring 18 is in a substantially concentric position with the rotatable sealing ring 20 and also within an annular retainer 22, concentrically mounted within the housing 10. An O-ring 21 seals the space between the retainer 22 and the housing 10, a mounting plate 23 attaches to the housing 10 (not shown) and thus secures the retainer 22 in axial position. Between the retainer 22 and the sealing ring 18 is a plurality of springs 24, spaced equidistantly and concentrically within the retainer 22. The springs 24 urge the sealing ring 18 into an engagement with the sealing ring 20. An O-ring 26 seals the space between the sealing ring 18 and an outer cylindrical surface 30 of the retainer 22. A non-sealing O-ring 28 reproduces axial forces of the springs 24 at the O-ring 26 and by virtue of an angular contact therewith holds at the same time the O-ring 26 in contact with a cylindrical surface 30 of the retainer 22. The non-sealing O-ring 28 is held within a disc 32, which acts also as a carrier, through which the springs 24 reproduce axial forces at the O-ring 28 and ultimately at the sealing ring 18. The sealing ring 20 is retained in an axial position against a radial extension of the shaft sleeve 34 by a spacer sleeve 36. An O-ring seal 38 precludes leakage between the sealing ring 20 and the shaft sleeve 34. The shaft sleeve 34 is located axially against a step on the shaft 12 and through an extension of the sleeve 36 by a locknut 40, which is threaded on the shaft 12 as shown. An O-ring seal 42 precludes leakage between the shaft sleeve 34 and the shaft 12. In operation, the radially extending faces of the sealing ring 20 and the sealing ring 18 are in a sealing relationship, maintaining a very narrow clearance, generated by a shallow and concentric groove pattern 44. FIG. 1 shows said narrow clearance exaggerated for clarity. The subject pattern has in many cases a shape of a logarithmic spiral. The pattern 44 can be electro-plated, etched or otherwise fabricated into the sealing ring 20 or alternatively into the sealing ring 18. Said narrow clearance prevents generation of friction heat and wear, yet limits the outflow of the sealed fluid present at the space 14.

Figure 2:
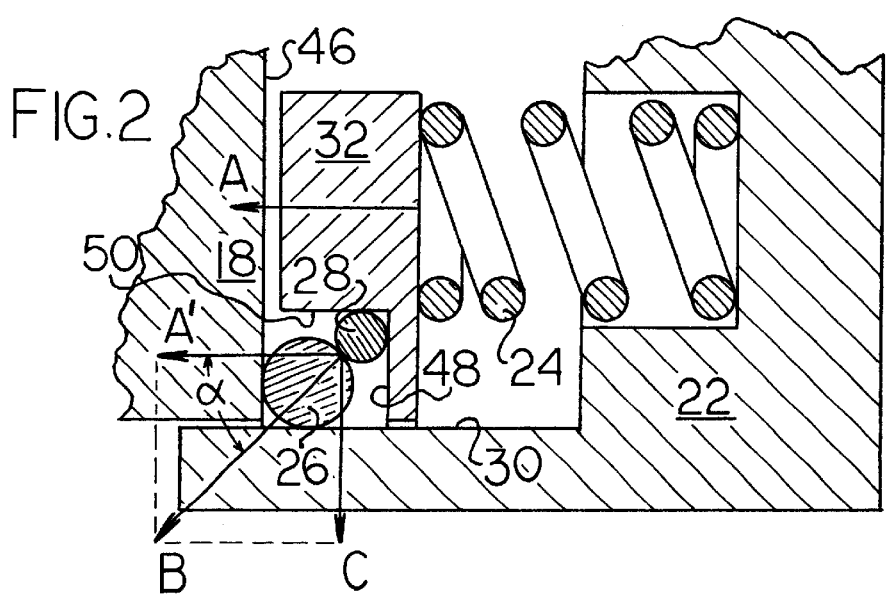
FIG. 2 is an enlarged fragmentary cross-sectional view of a secondary seal of this invention.

FIG. 2 shows an enlarged fragmentary cross-sectional view of a secondary seal of this invention. Pictured is one of the pluralities of springs 24, spaced within the retainer 22. Springs 24 exert an axial force depicted by an arrow A onto the disc 32. Through a facing surface 48 of the disc 32 and through an internal cylindrical surface 50 of the disc 32 the axial force A is further transmitted to the non-sealing O-ring 28. The O-ring 28 then transmits this axial force A to the O-ring 26, but an actual contact force, depicted by an arrow B between the O-ring 28 and the O-ring 26 will be larger in magnitude than the axial force A and will assume an angle a equal to the angle between the straight line connecting centers of the cross-sections of the O-rings 28 and 26 and the direction of the force A. Magnitude of the contact force B will be approximately defined by a relationship:

$$B = A/\cos(\alpha)$$

using the above symbols B, A and $\alpha$ for the contact force, the axial force and the angle respectively. As the contact force B acts on the sealing O-ring 26, it translates into two forces, one an axial force depicted as an arrow A' and acting from the O-ring 26 onto a back surface 46 of the sealing ring 18, the other a radial force depicted as an arrow C and acting from the O-ring 26 onto the surface 30 of the retainer 22. Said axial force A' will be approximately equal in magnitude to the axial force A. To better show geometrical relationships between forces A', B, C and $\alpha$, arrows A' and C are drawn with their origins at the contact point between the O-rings 26 and 28, rather than at the respective contact points among the O-ring 26, the back surface 46 and the cylindrical surface 30. Said radial force C will be approximately defined by a relationship:

$$C = A*\tan(\alpha)$$

using previously defined symbols. As can be seen from the above, for a particular value of the axial force A one can freely control the magnitude of the force C through changes in the angle $\alpha$. Thus one can: (a) design the axial spring load A to best satisfy the criteria for the optimum performance of the non-contacting seal; (b) design the force C to maintain a sealing and low-friction contact between O-ring 26 and the surface 30; (c) calculate the angle $\alpha$ needed to satisfy both (a) and (b); (d) design the space between sealing ring 18 and the disc 32 to provide O-rings 26 and 28 with the contact at an angle $\alpha$.

FIG. 3 is an enlarged fragmentary cross-sectional view of another embodiment of the invention, where a compliant wedge element 28' which is approximately triangular in cross-section is used in place of the non-sealing O-ring 28. Two adjacent sides of said triangular cross-section wedge abut the surfaces 48 and 50 of the disc 32 and a third side 52 exerts a contact force B', said contact force B' being approximately perpendicular in direction to the third side 52. Calculations of the force B' are similar to those for the force B.

I claim:

1. A Device sealing a fluid at a space between a housing and a rotatable shaft projecting along an axial direction, comprising:

a first seal ring mounted on said shaft for rotation therewith and having a planar front sealing surface;

a second seal ring being axially movable and substantially coaxial with said first seal ring;

said second seal ring having a back surface and a planar front sealing surface defining a clearance with said first seal ring planar front sealing surface;

an external cylindrical surface of said housing, engaging axially said second seal ring;

an elastic means cooperating with said housing for axially biasing said second seal ring towards said first seal ring to close said clearance;

a disc positioned between said elastic means and said back surface, said disc having a facing surface thereon which is disposed in generally parallel axially opposed and axially spaced relation to said back surface, said disc having an internal cylindrical surface thereon which coaxially delimits outer diameter of said facing surface;

a secondary seal positioned between said disc and said back surface, said secondary seal being in sealing contact with said external cylindrical surface and said back surface, said secondary seal being an elastomeric O-ring disposed in surrounding relationship to said external cylindrical surface;

improvement being a compliant means separating said disc and said secondary seal, said compliant means being in simultaneous contact with said facing surface and said internal cylindrical surface of said disc, said compliant means engaging said secondary seal from a diagonal direction towards both said back surface and said external cylindrical surface, said diagonal direction and said axial direction forming an angle of between approximately 10° and 70°.

2. Device according to claim 1, where said compliant means is an elastomeric O-ring.

3. Device according to claim 2, where said secondary seal is of ³⁄₃₂" nominal cross-section size.

4. Device according to claim 3, where said compliant means is of 70 durometer hardness.

5. Device according to claim 4, where said compliant means is one nominal cross-section size smaller than said secondary seal.

6. Device according to claim 5, where said secondary seal is of 90 durometer hardness.

7. Device according to claim 6, where said diagonal direction forms with axial direction an angle of approximately 33°.

8. Device according to claim 1, where said compliant means is an elastomeric element with cross-section in shape of a triangle.

9. Device according to claim 8, where said secondary seal is of ³⁄₃₂" nominal cross-section size.

10. Device according to claim 9, where said compliant means is of 70 durometer hardness.

11. Device according to claim 10, where said triangle is such, that the ratio of the shortest side to the longest side of said triangle is approximately 0.55.

12. Device according to claim 11, where said secondary seal is of 90 durometer hardness.

* * * * *